(12) United States Patent
Smith et al.

(10) Patent No.: US 11,768,101 B2
(45) Date of Patent: Sep. 26, 2023

(54) SUITCASE WEIGHING LUGGAGE RACK

(71) Applicants: William Smith, Vero Beach, FL (US); Cameron Smith, Steamboat Springs, CO (US)

(72) Inventors: William Smith, Vero Beach, FL (US); Cameron Smith, Steamboat Springs, CO (US)

(*) Notice: Subject to any disclaimer, the term of this patent is extended or adjusted under 35 U.S.C. 154(b) by 25 days.

(21) Appl. No.: 17/229,586

(22) Filed: Apr. 13, 2021

(65) Prior Publication Data

US 2022/0221331 A1     Jul. 14, 2022

Related U.S. Application Data

(60) Provisional application No. 63/137,134, filed on Jan. 13, 2021.

(51) Int. Cl.
*G01G 19/52* (2006.01)
*G01G 21/23* (2006.01)
*G01G 23/37* (2006.01)
*G01G 21/28* (2006.01)

(52) U.S. Cl.
CPC ............ *G01G 19/52* (2013.01); *G01G 21/23* (2013.01); *G01G 21/283* (2013.01); *G01G 23/3742* (2013.01)

(58) Field of Classification Search
CPC ........ G01G 19/52; G01G 21/23; G01G 21/28; G01G 21/283; G01G 23/3742
See application file for complete search history.

(56) References Cited

U.S. PATENT DOCUMENTS

| | | | | |
|---|---|---|---|---|
| 7,692,107 | B1* | 4/2010 | Shotey | G01G 19/58 177/245 |
| 9,084,018 | B2* | 7/2015 | Nishigai | H04N 21/41407 |
| 2002/0113715 | A1* | 8/2002 | Wilson | G01B 5/02 340/815.45 |
| 2008/0035391 | A1* | 2/2008 | Jewett | G01G 19/52 177/144 |
| 2016/0374516 | A1* | 12/2016 | Lammel | G01G 23/00 269/11 |
| 2017/0227395 | A1* | 8/2017 | Esmail | G01G 19/52 |
| 2020/0348165 | A1* | 11/2020 | Lambeth | G01G 23/3735 |

* cited by examiner

*Primary Examiner* — Randy W Gibson
(74) *Attorney, Agent, or Firm* — TOPE-MCKAY & ASSOCIATES

(57) ABSTRACT

Described is a weighing luggage rack having a rack portion with a top section and a bottom section, and a platform portion connected with the top section of the rack portion. In use, the platform portion is stacked on top of the rack portion. The weighing luggage rack further includes a weighing mechanism, and an electronic display configured to display a weight of an object placed thereon. Further embodiments include a weighing luggage rack with only a rack portion and a weighing luggage rack with only a platform portion.

16 Claims, 14 Drawing Sheets

SUITCASE WEIGHING LUGGAGE RACK

CROSS-REFERENCE TO RELATED APPLICATIONS

This is a Non-Provisional Application of U.S. Provisional Application No. 63/137,134, filed in the United States on Jan. 13, 2021, entitled, "Suitcase Weighing Luggage Rack," the entirety of which is incorporated herein by reference.

BACKGROUND OF INVENTION

(1) Field of Invention

The present invention relates to a luggage rack and, more particularly, to a luggage rack that also weighs luggage.

(2) Description of Related Art

Most airlines have strict weights limits for checked luggage/baggage. Upon check-in, the luggage is weighed by the airline employee. If the luggage exceeds the airline's limit, the traveler must either remove items from the luggage to reduce its weight, or pay a fee. If the traveler decides to remove items from the luggage, the traveler often has to open his bag on the floor in front of the agent in a hurried and embarrassing manner and then reweigh in front of the agent to see if they are now under the limit. Every traveler would like to avoid this situation.

There are currently handheld spring scales that can be used to weigh luggage prior to checking luggage at the airline counter. These devices attach to a handle of a suitcase or bag in order to weigh the luggage. To use these devices, the user attaches the device to the handle of the luggage, holds the weighing device, and allows the luggage to hang from the device in order to obtain a weight of the luggage item. The disadvantage of these types of devices is that the luggage must be closed prior to weighing; otherwise, the personal items in the luggage will fall out. Therefore, the user must weigh the zipped luggage, place the luggage down, unzip the luggage, remove or add more personal items, and then weigh the luggage again. This is an inconvenient and imprecise process.

Thus, a continuing need exists for a luggage rack that allows a user to weigh their luggage while they are packing.

SUMMARY OF THE INVENTION

The present invention relates to a luggage rack and, more particularly, to a luggage rack that also weighs luggage. The luggage rack comprises a rack portion comprising a top section and a bottom section; a platform portion connected with the top section of the rack portion, wherein, in use, the platform portion is stacked on top of the rack portion; a weighing mechanism; and an electronic display configured to display a weight of an object placed thereon.

In another aspect, the weighing mechanism comprises one or more sensors.

In another aspect, the one or more sensors are attached with the platform portion.

In another aspect, the one or more sensors are attached with the top section of the rack portion.

In another aspect, the weighing mechanism is configured to wirelessly communicate with a mobile application.

The present invention further relates to a weighing luggage rack, comprising a rack portion having a top section and a bottom section; a weighing mechanism attached with the rack portion; and an electronic display configured to display a weight of an object placed thereon.

In another aspect, the weighing mechanism comprises one or more sensors.

In another aspect, the bottom section of the rack portion comprises a set of legs, and the one or more sensors are attached to at least one leg in the set of legs.

In another aspect, the one or more sensors are attached with the top section of the rack portion.

The present invention further relates to a weighing luggage rack comprising a platform portion formed to be placed on top of an existing luggage rack, wherein the platform portion comprises a weighing mechanism, and an electronic display configured to display a weight of an object placed thereon.

In another aspect, the weighing mechanism comprises one or more sensors.

In another aspect, the weighing mechanism further comprises a sensor housing surrounding each sensor and attached with the platform portion.

In another aspect, the weighing luggage rack further comprises a securing element configured for positioning the platform portion onto at least a portion of the existing luggage rack.

In another aspect, the weighing mechanism further comprises a tubular support element attached with the platform portion, and a movable guide with a locking mechanism formed to engage with the tubular support element, such that the platform portion is secured against at least a portion of the existing luggage rack.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a luggage rack and, more particularly, to a luggage rack that also weighs luggage. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Specific Details of Various Embodiments

Figure 2:
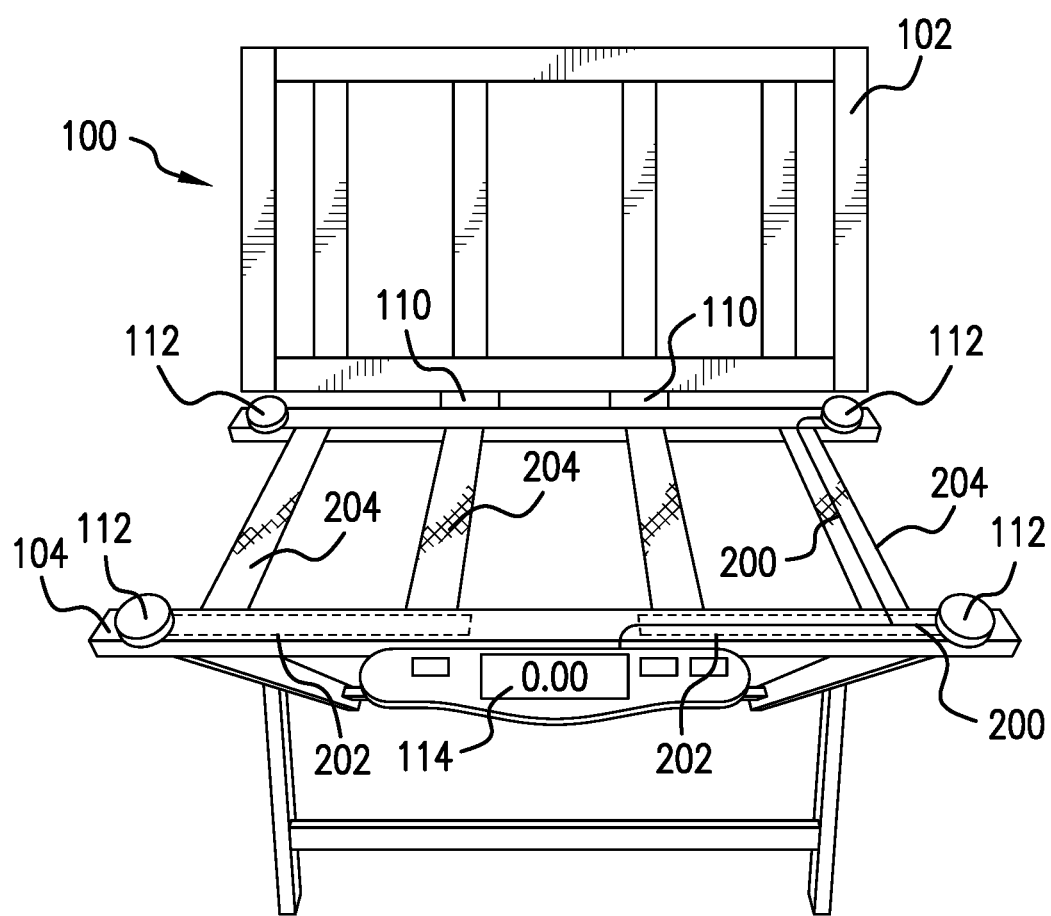
FIG. 2 is an illustration of the weighing luggage rack with the platform portion lifted away from the rack portion, showing sensors attached with the rack portion according to some embodiments of the present disclosure.
Figure 3:
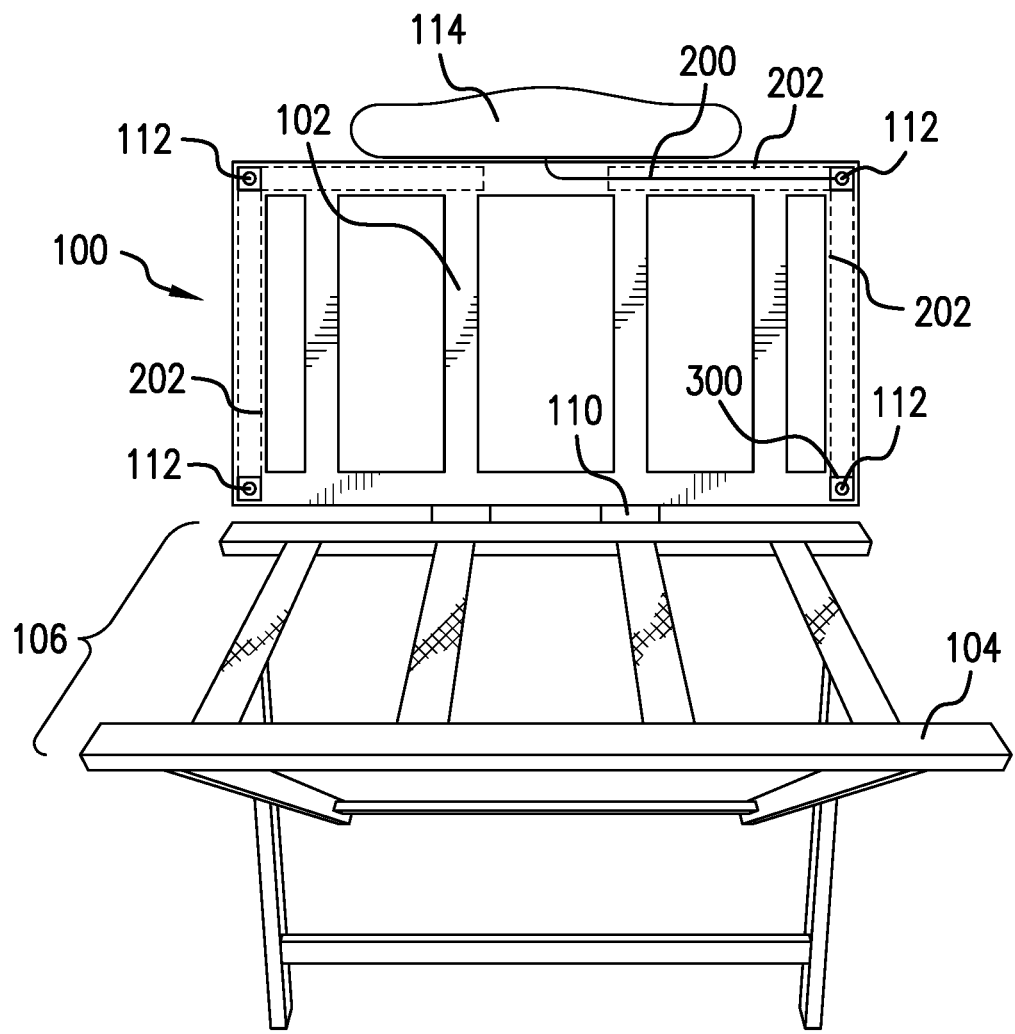
FIG. 3 is an illustration of the weighing luggage rack with the platform portion lifted away from the rack portion, showing sensors attached with the platform portion according to some embodiments of the present disclosure.

The invention described herein is a luggage rack that provides the dual purpose of weighing the luggage that is placed on the luggage rack. FIGS. 1-14 illustrate various views and embodiments of the weighing luggage rack 100 described herein. In the embodiment shown in FIGS. 1-5, the weighing luggage rack 100 comprises a platform portion 102 connected with a rack portion 104. The platform portion 102, comprised of wood, glass, metal, or any other suitable material, is stacked on top of and hingedly connected via a set of hinges 110 (made of metal, fabric, or the like) with the rack portion 104. Specifically, one of the long sides of the platform portion 102 is aligned with and connected with one of the long sides of the rack portion 104 via the hinges 110, as depicted in FIGS. 2 and 3. The platform portion 102 is rectangular in shape, having two parallel long sides, and two parallel short sides. Similarly, a top section 106 of the rack portion 104 (shown in FIG. 3) is rectangular in shape, having two parallel long sides and two parallel short sides. Furthermore, the weighing luggage rack 100 is foldable/collapsible in order to be portable for storage either within a hotel room or a user's home.

Figure 4:
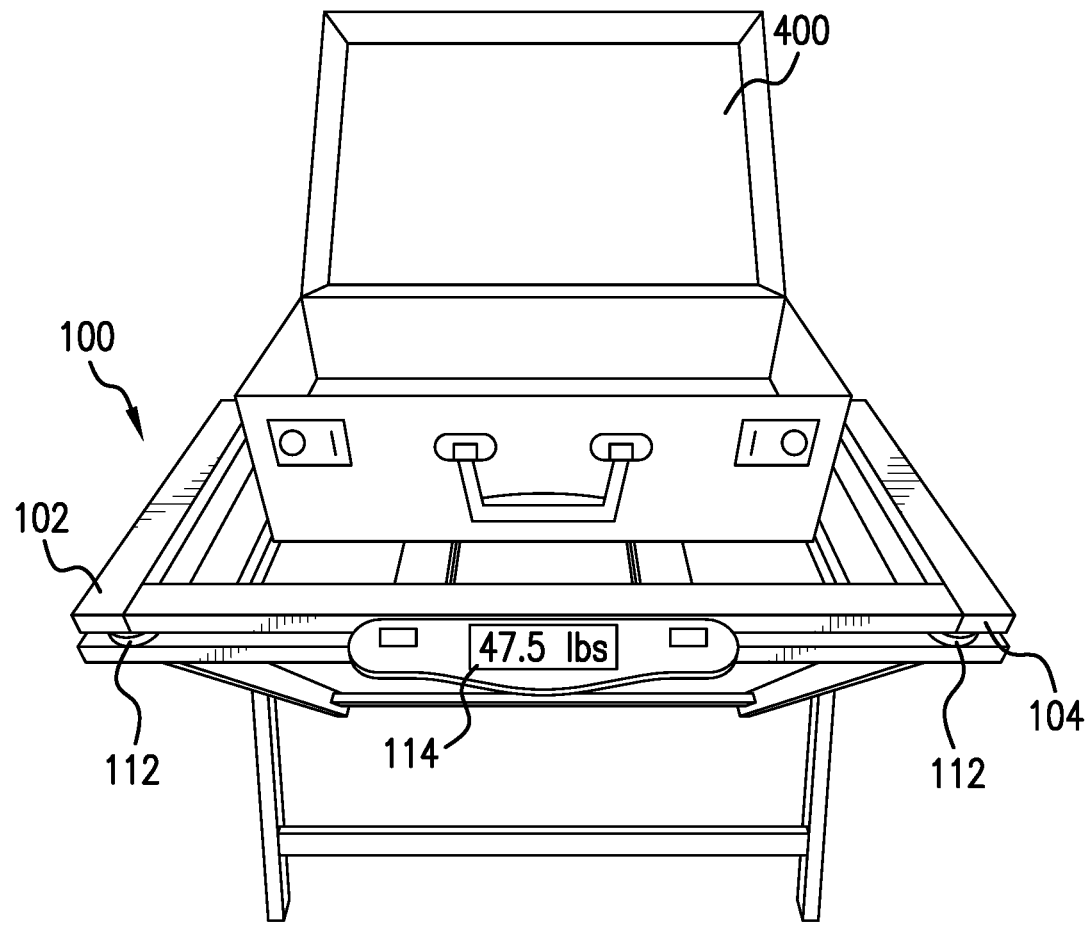
FIG. 4 is an illustration of the weighing luggage rack in use, showing a piece of luggage being weighed according to some embodiments of the present disclosure.
Figure 5:
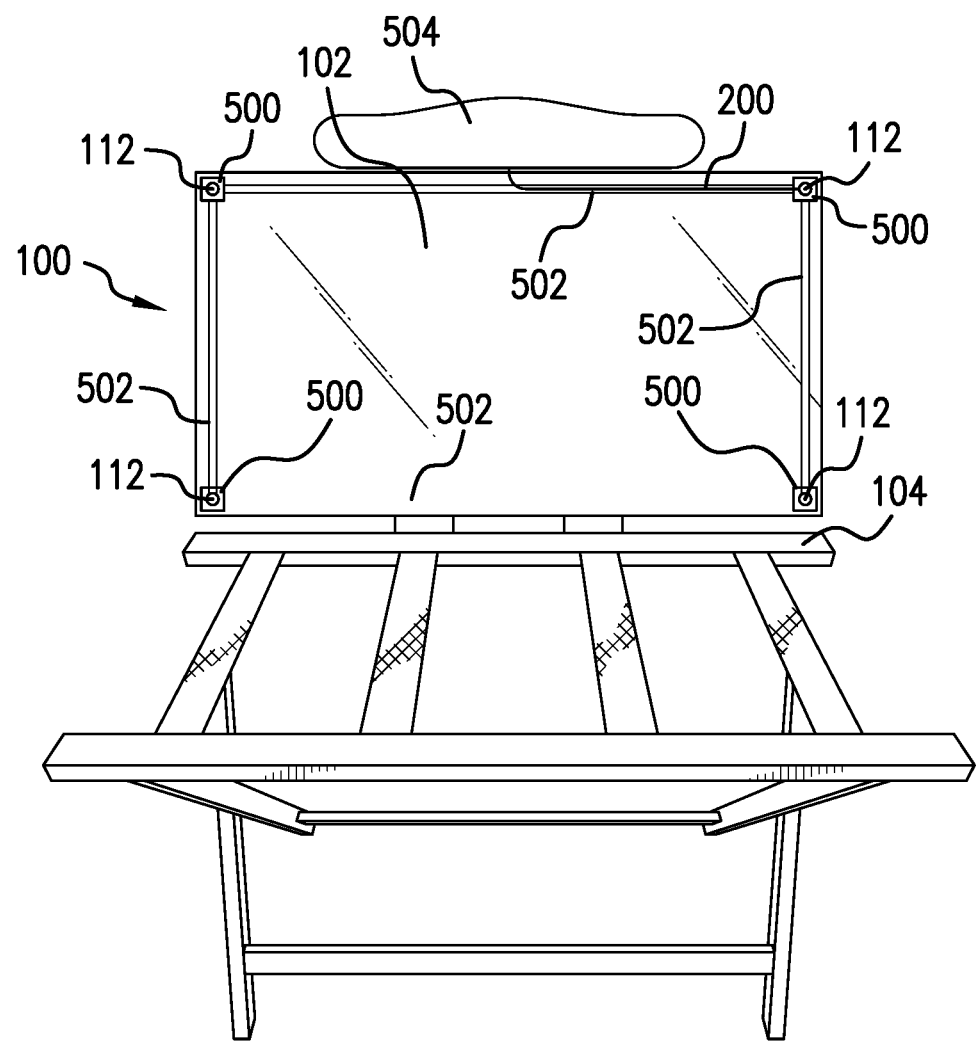
FIG. 5 is an illustration of the weighing luggage rack with a glass platform portion lifted away from the rack portion, showing sensors attached to the glass platform portion according to some embodiments of the present disclosure.

As described above, the rack portion 104 has a top section 106 which provides a flat surface to support both the platform portion 102 and luggage. The top section 106 can comprise one continuous material (e.g., wood) or slats, or straps, of a material (e.g., wood, metal, fabric) with spaces in between, as depicted in FIGS. 2, 3, and 5. Any material and arrangement of the top section 106 is possible given that it provides a flat surface that is stable and large enough to support luggage. Thus, in the embodiment depicted in FIG. 1, the platform portion 102 and the rack portion 104 are formed to be able to support and stabilize luggage 400 placed thereon, as shown in FIG. 4.

Figure 1:
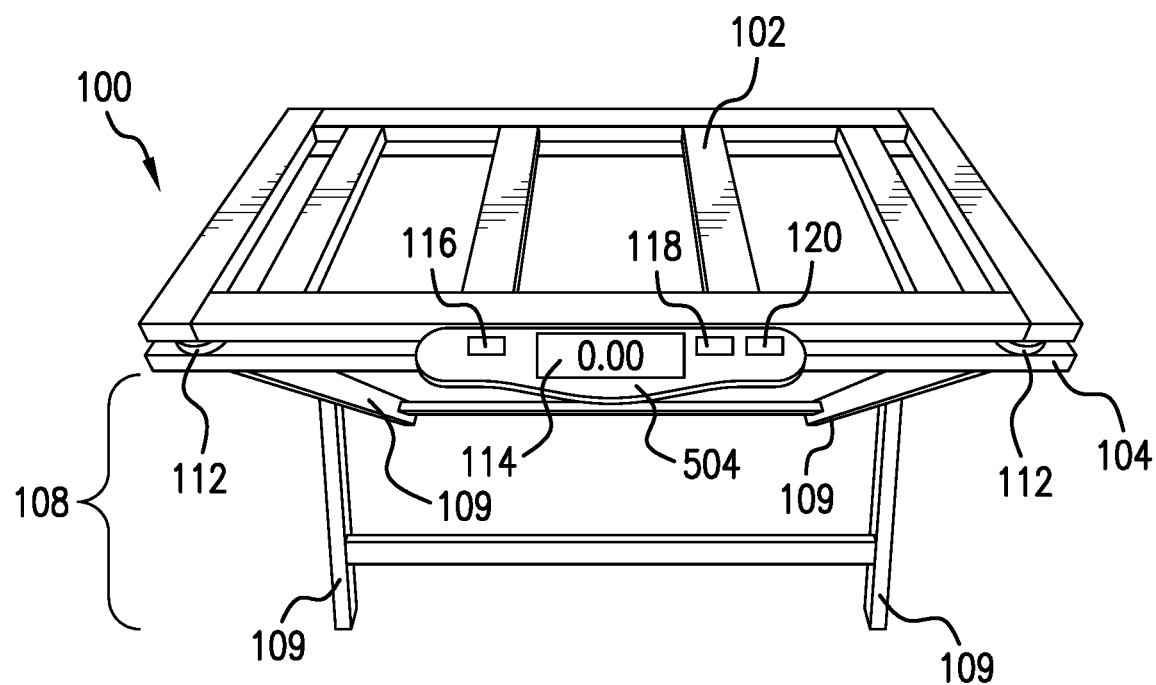
FIG. 1 is an illustration of a weighing luggage rack with a platform portion resting on top of the rack portion, showing sensors sandwiched between the platform portion and rack portion according to some embodiments of the present disclosure.

As depicted in, at least, FIG. 1, the rack portion 104 further includes a bottom section 108 comprising four legs 109 for stabilizing the weighing luggage rack 100 when it is in use. The platform portion 102, when in use, is stacked directly on top of and aligned with the top section 106 of the rack portion 104 to receive luggage. As described above, the platform portion 102 is connected along one of its sides with one of the sides of the rack portion 104. In one embodiment, the connection is a hinge-type mechanism with a movable joint which connects the platform portion 102 with the rack portion 104. The hinge 110 can be comprised of fabric, metal, or any suitable material that can securely, yet movably, connect the platform portion 102 to the rack portion 104. The platform portion 102 can be flipped completely off and over the top section 106 of the rack portion 104 when not in use. FIG. 4 depicts the weighing luggage rack 100 in use. The platform portion 102 is positioned directly on top of the rack portion 104, and the luggage 400 (e.g., bag, suitcase) is placed on top of the platform portion 102 to weigh the luggage 400.

The weighing luggage rack 100 further comprises an internal weighing mechanism comprising one or more load cell sensors 112 (e.g., strain gauge load cell sensors) for detecting the weight of an object placed on the weighing luggage rack 100. As shown in FIGS. 1-5, the sensors 112 are positioned between the platform portion 102 and the rack portion 104 when the platform portion 102 is on top of the rack portion 104. The sensors 112 may be attached with the platform portion 102, as depicted in FIGS. 3 and 5, or with the rack portion 104, as depicted in FIG. 2. Additionally, connection wiring 200 between the sensors 112 and a main electronics 504 housing are positioned within a channel 202 (or similar indentation; shown in dashed lines) within the rack portion 104, as shown in FIG. 2, to hide the wiring 200. Similarly, the channel (or channels) 202 and wiring 200 can be located in the platform portion 102, as shown in FIG. 3. As depicted in FIGS. 2 and 3, the wiring 200 is only shown in one of the channels 202 for illustrative purposes; however, wiring 200 exists between each sensor 112 and the main electronics 504. In an embodiment in which the platform portion 102 is a wood platform portion 102, the channel(s) 202 are routed into the wood and a thin veneer layer of wood is glued over the bottom of the platform portion 102 to hide the channel(s) 202.

FIG. 5 illustrates a glass embodiment of the platform portion 102, where sensor housings 500 holding the sensors 112 are attached with the platform portion's 102 corners, and wires 200 run in thin, metal tubes 502 between the sensor housings 500 and the main electronics 504 of which the display is a component. Each sensor housing 500 comprises one or more batteries and any additional electronics needed for each sensor 112 to function properly. The metal tubes 502 are attached to the glass platform portion 102. Likewise, if the platform portion 102 is made of metal, metal tubes 502 within the metal material are used to house the wiring 200. The main electronics 504 comprise a microcontroller, a LCD (liquid crystal display) or LED (light emitting diodes) display 114, a battery compartment (for AA, AAA, or 9V battery or batteries), a wireless (e.g., Bluetooth®) transceiver, and the electronics to run the load cell sensors 112. The electronic scale display 114 shows the weight of an object (e.g., suitcase 400) placed on the weighing luggage rack 100 so that a user can easily choose what to bring on a trip while remaining under baggage restriction or penalty limits. As illustrated in FIG. 1, the main electronics 504 may also include an on/off button 116, a zero (or tare) button 118 to zero out the weight before placing a piece of luggage (e.g., suitcase) on the platform portion 102, and a kg/lb button 120 (or switch) to change between kilograms and pounds as a weight measurement unit. Zeroing out the weight prior to placing luggage on the weighing luggage rack 100 is important in order to accommodate anything non-luggage oriented above the sensors 112. For instance, one does not want the weight of the platform portion 102 to affect the final weight of the luggage 400. Therefore, it is necessary for the user to zero out the weight after the platform portion 102 is positioned on the rack portion 104 and before any luggage 400 is placed on the platform portion 102.

Unlike existing luggage weighing devices, which are attached to a closed bag or suitcase, the present invention does not require the luggage 400 to be closed, zipped, and/or picked up, as is required by existing baggage weighing devices that attach to the handle of the luggage. In fact, the user may use the weighing luggage rack 100 while in the process of packing to determine what should or should not be included in the luggage 400. In one aspect, the weighing luggage rack 100 includes a mechanism that uses wireless communication (e.g., Bluetooth®) technology between sensors 112 and the main electronics 504 to allow for wireless communication of the weight of the object (e.g., luggage 400) placed on the weighing luggage rack 100 and transmission of this information to a mobile application (app) on a mobile device, such as a smartphone.

Figure 6:
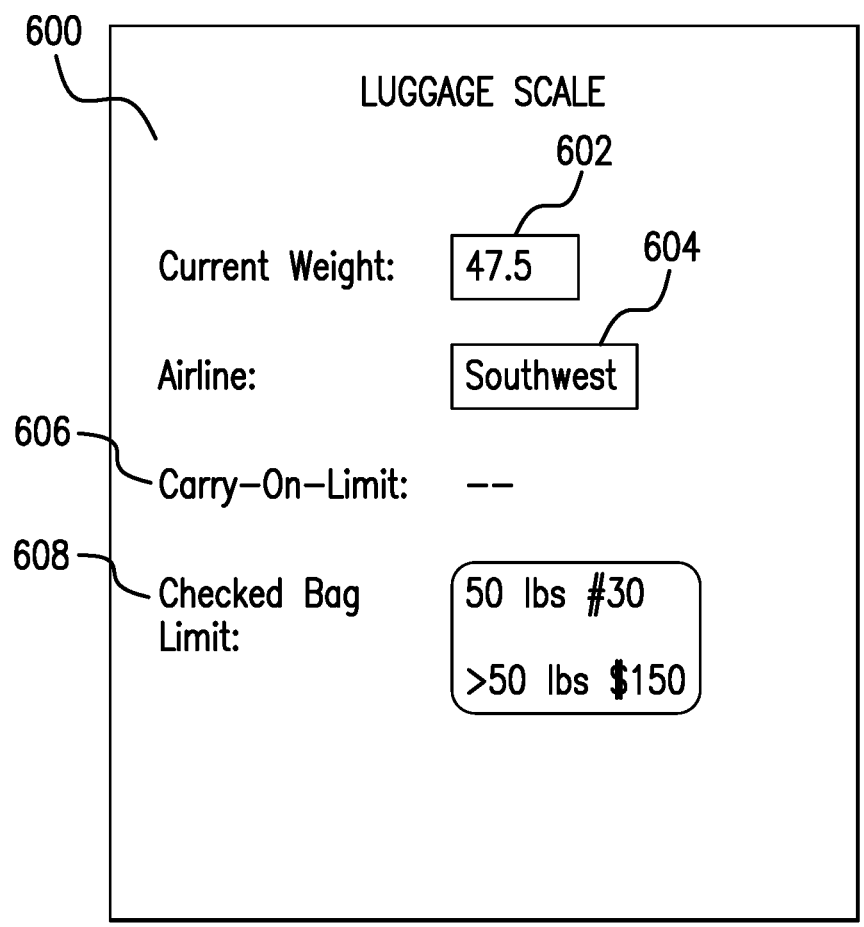
FIG. 6 is an illustration of a screenshot of a mobile application used in conjunction with the weighing luggage rack according to some embodiments of the present disclosure.

FIG. 6 depicts an example of a screenshot 600 of the mobile app used in conjunction with the present invention. The screenshot 600 shows a weight reading 602 for the luggage 400 as obtained from the sensors 112 and main electronics 504 of the weighing luggage rack 100; a dropdown airline selection menu 604; carry-on luggage limit 606; and checked bag and associated fees 608. In addition, the mobile app can be configured to display airline restrictions for batteries, other restricted items, size of luggage, and other relevant travel details based on the user's geographical location given either by the user's input or by the geographical positioning system (GPS) of the mobile device.

As shown in FIGS. 3 and 5, the sensors 112 are attached directly to the platform portion 102 under corners of the platform portion 102. Thus, each sensor 112 is sandwiched between the platform portion 102 and the rack portion 104 at one or more of the four corners. In one aspect (as shown in FIG. 3), each sensor 112 is installed into a cavity 300 within the platform portion 102 under all four corners. Thus, the connecting wires 200 are internal to the platform portion 102 and converge at the electronic scale display 114/main electronics 504 attached to the platform portion 102.

FIG. 2 shows an embodiment of the weighing luggage rack 100 in which the one or more sensors 112 are installed into a cavity or indentation within the top section of the rack portion 104, such that at least a portion of each sensor 112 protrudes above the surface of the top section when the platform portion 102 is lifted away from the rack portion 104. Further, straps 204 extend across the top section of the rack portion 104. These straps 204, which can be comprised of fabric, wood, metal, or the like, extend from one pair of parallel members of the rack portion 104 to keep the weighing luggage rack 100 from collapsing and to form a stable surface for the luggage. In this embodiment, the connection wires 200 run through the material (e.g., wood) of the top section 106 of the rack portion 104. The connection wires 200 can also run through the straps 204 to converge back to the main electronics 504. Furthermore, the wiring connection can also be an internal arrangement through the wood/metal of the rack portion 104 descending down the rear legs to the leg connection points and then up the front legs and to the main electronics 504, as depicted in FIG. 7.

In another embodiment, the rack portion 104 includes four corner guides (or channels) in its top section 106, and the platform portion 102 comprises protruding areas formed to align with and fit within the guides in the rack portion 104. Thus, the platform portion 102 can be correctly positioned on top of the rack portion 104 without a hinge or attachment, while still fulfilling the intended function. As can be appreciated by one skilled in the art, the platform portion 102 can also be formed with the corner guides (or channels), and the top section 106 of the rack portion 104 can be formed with the protruding areas.

Figure 7:
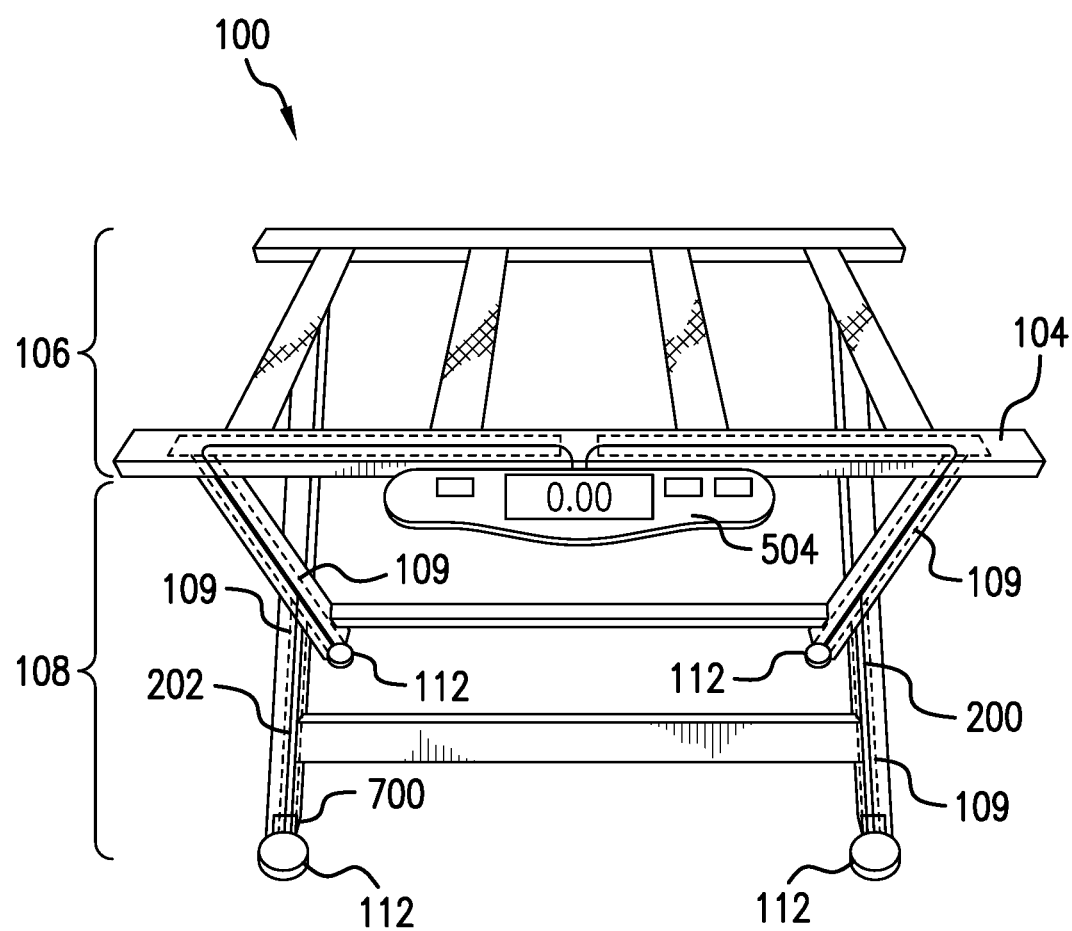
FIG. 7 is an illustration of the weighing luggage rack with only a rack portion and sensors in the legs of the rack portion according to some embodiments of the present disclosure.

In yet another embodiment shown in FIG. 7, the one or more sensors 112 are positioned under the four legs of the bottom section 108 of the rack portion 104. In this embodiment, the sensors 112 are installed into a cavity 700 within each leg 109, where only a portion of each sensor 112 protrudes from the cavity 700, contacting the ground. In this embodiment, the connecting wires 200 run through the legs 109 and the rack portion 104 to the main electronics 504. In this embodiment, there is no platform portion. The luggage simply rests on the top section 106 of the rack portion 104.

Figure 8:
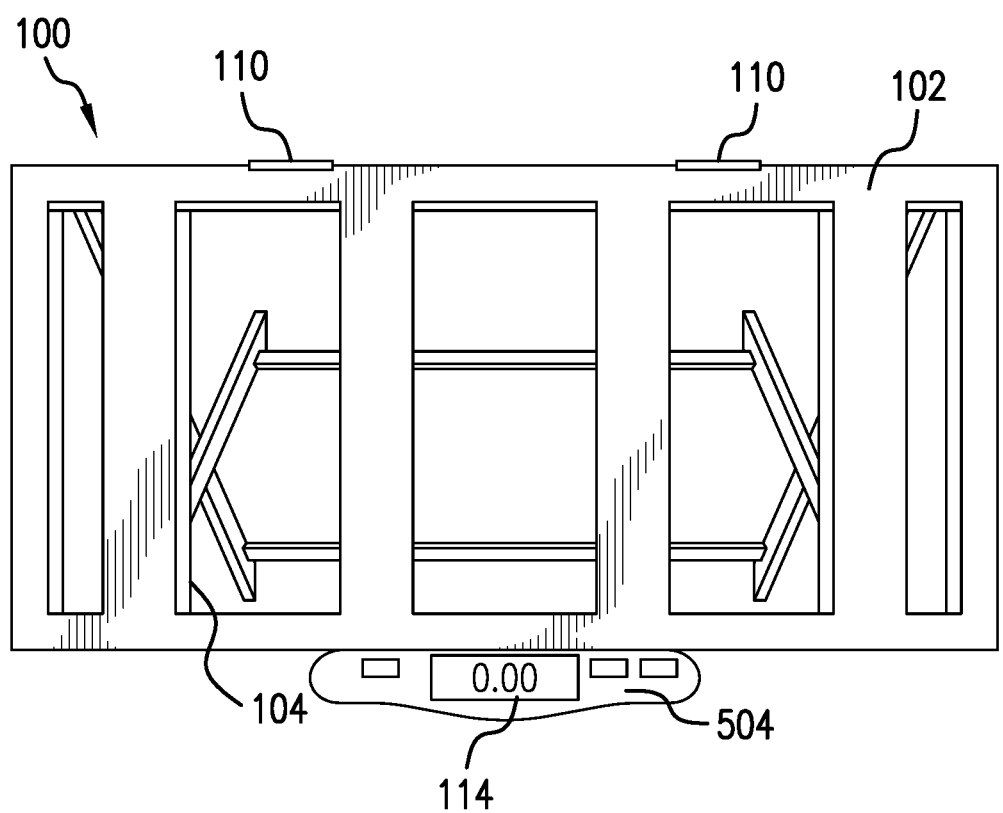
FIG. 8 is a top-view illustration of the weighing luggage rack with the platform portion resting on top of the rack portion according to some embodiments of the present disclosure.

FIG. 8 is a top-view illustration of the embodiment of the weighing luggage rack 100 shown in FIG. 1, with the platform portion 102 resting on top of the rack portion.

Figure 9:
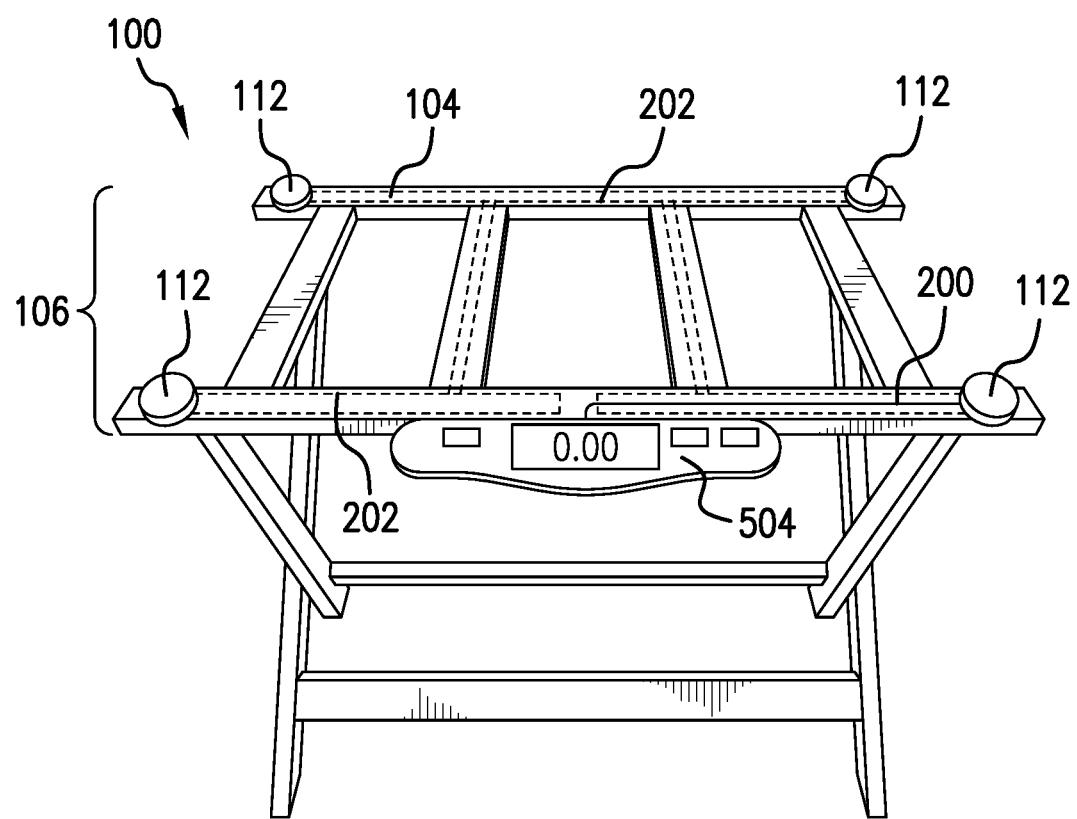
FIG. 9 is an illustration of the weighing luggage rack with only a rack portion and sensors attached with the top section of the rack portion according to some embodiments of the present disclosure.

FIG. 9 illustrates an embodiment of the invention in which there is no platform portion, and the sensors 112 are installed into the top section 106 of the rack portion 104. In this embodiment, a large suitcase or bag would be placed on the top section 106 of the rack portion 104, and the luggage would need to be large enough to cover each of the sensors 112 for an accurate weight reading.

Figure 10:
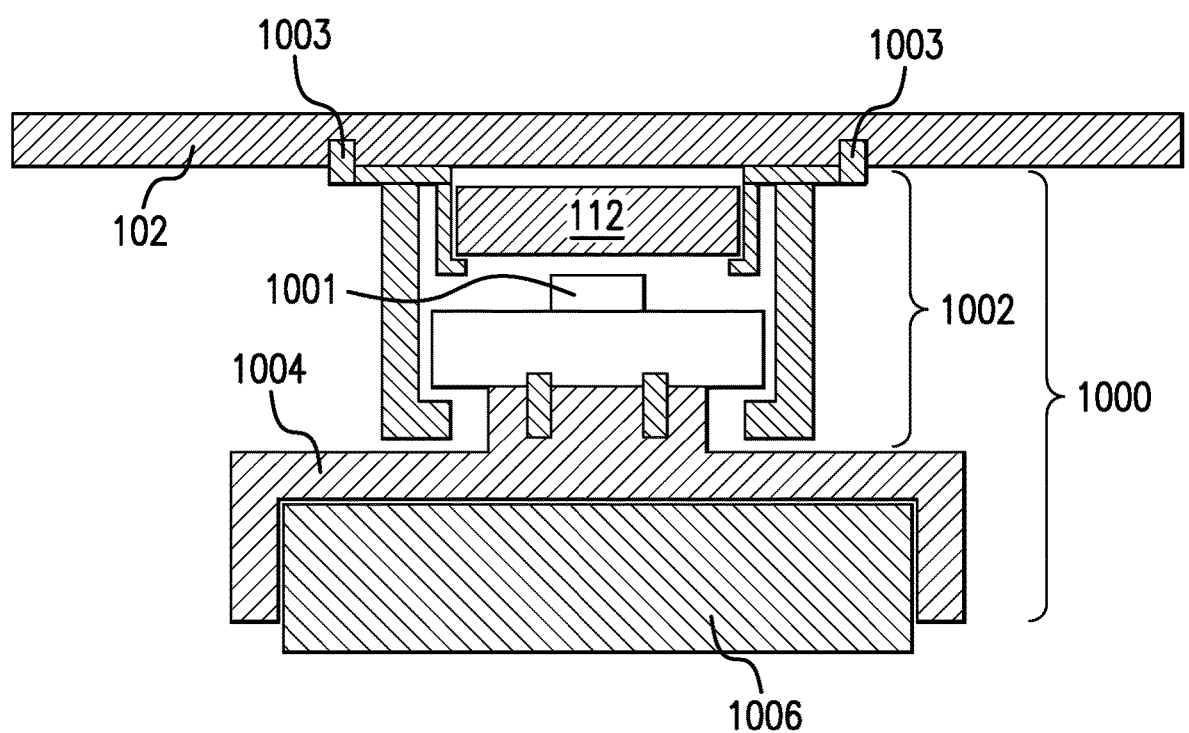
FIG. 10 is a cross-sectional view illustration of a platform portion having a sensor housing that can be positioned onto a rectangular, flat rail of an existing luggage rack according to some embodiments of the present disclosure.
Figure 11:
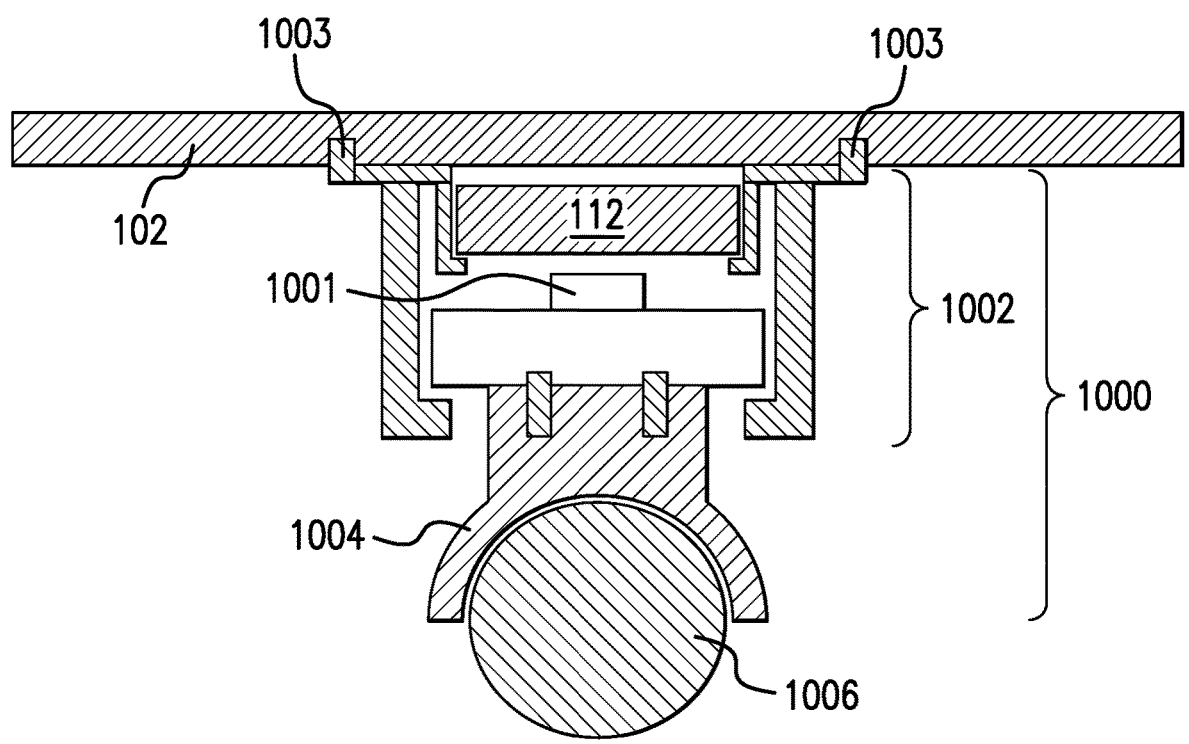
FIG. 11 is a cross-sectional view illustration of a platform portion having a sensor housing that can be positioned onto a rounded rail of an existing luggage rack according to some embodiments of the present disclosure.
Figure 12:
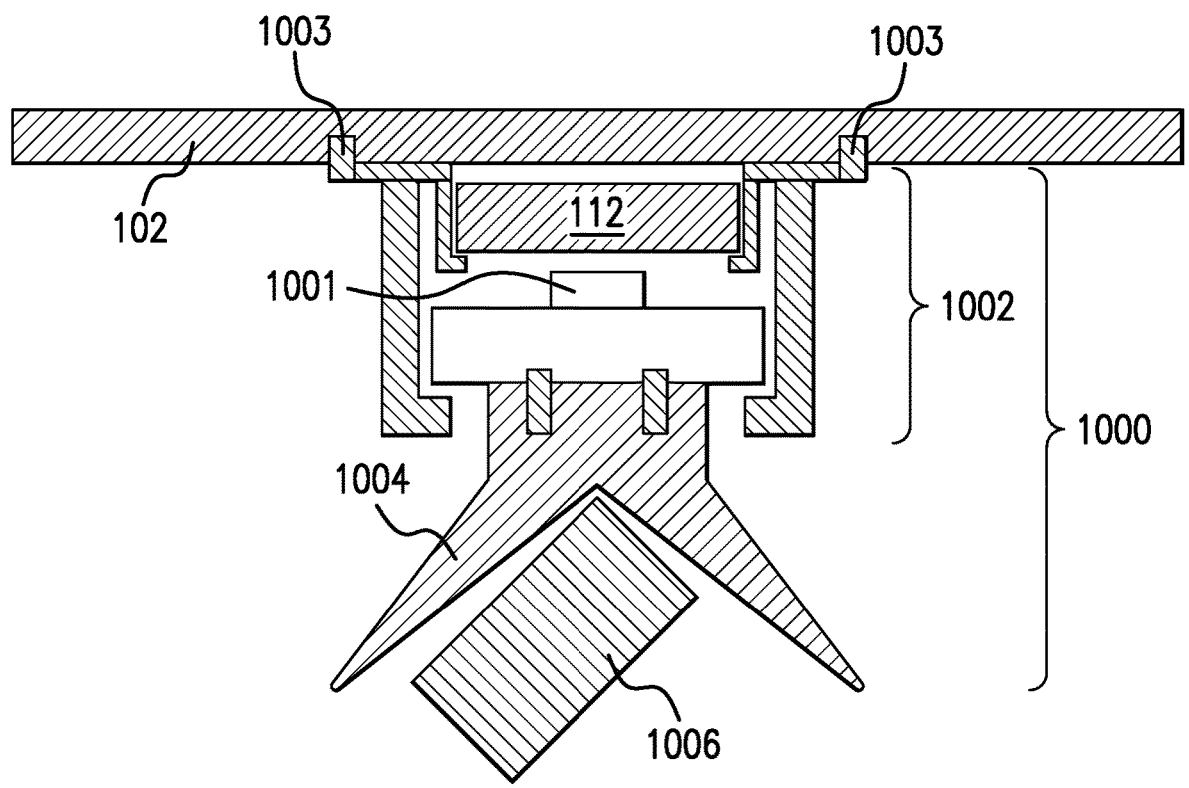
FIG. 12 is a cross-sectional view illustration of a platform portion having a sensor housing that can be positioned onto a rectangular, angled rail of an existing luggage rack according to some embodiments of the present disclosure.

In another embodiment depicted in the cross-sectional view illustrations in FIGS. 10-12, the present invention comprises only the platform portion 102, which can then be placed on an existing luggage rack in order to weigh luggage. In use, the platform portion 102 will be placed on top of an existing luggage rack having a size and shape that is similar to the platform portion 102. In this embodiment, a platform brace 1000 comprising a sensor housing 1002 (square or circular) is attached to the platform portion 102. A load sensor 112 resides within the sensor housing 1002 and is fixed in place. The platform brace 1000 also comprises a securing element 1004 (made of, for instance, plastic) which extends from the lower portion of the sensor housing 1002 and expands to a claw-like structure that can fit over both sides of a rail 1006 of an existing luggage rack. The securing element 1004 can move freely, to some extent, inside the sensor housing 1002 such that when sandwiched between the sensor 112 and the rail 1006, a sensor button 1001 on the securing element 1004 contacts the sensor 112, creating an electrical signal that travels through wires connected to the sensor 112 and to the main electronics 504. The sensor 112 itself has a bead in the middle of the sensor 112 that is raised slightly above the main portion of the sensor 112. The sensor button 1001 is a round metal part that is intended to contact forcibly against the bead on the sensor 112. When the sensor button 1001 is compressed against the bead in the sensor 112, it generates an electrical signal proportional with the force being applied. As with the embodiments described above, the sensor housings 1002 and sensors 112 therein are attached at each corner of the platform portion 102.

As can be appreciated by one skilled in the art, there are various types of luggage rack designs with respect to the cross-sections of the rails 1006 that hold the luggage. Non-limiting examples include rectangular and flat (usually wood), a round tube (usually metal), and angled rectangular (usually wood). FIGS. 10-12 illustrate a universal sensor housing 1002 that three different securing elements 1004 can be attached to for one of the types of luggage racks currently on the market. The sensor housing 1002 is attached with the platform portion 102 via an attachment element 1003. In one embodiment, the attachment element 1003 is a strong adhesive (e.g., double-sided adhesive), and the sensor housing 1002 is affixed to the wood or tempered glass platform portion 102 with the strong adhesive (e.g., double-sided adhesive) to allow the customer to position the sensor housings 1002 at desired locations based on the specific luggage rack they own. For instance, when the present invention is initially unboxed, the customer would, using their specific existing luggage rack, locate and adhere the four sensor housings 1002/securing elements 1004 (with instructional guidance) to the underside of the platform portion 102 so that the four sensor housings 1002/securing elements 1004 do not interfere with any straps that connect the two beams that hold the luggage and keep the existing luggage rack from collapsing. Thus, a customer would peel off double-sided adhesive stickers/taps: and then permanently affix the chosen sensor housings 1002/securing elements 1004 to the platform portion 102 to best match their specific luggage rack. In another aspect, the attachment elements 1003 are screws (or the like), and the platform portion 102 may be sold with the sensor housings 1002/securing elements 1004 already attached to the platform portion 102.

Figure 13:
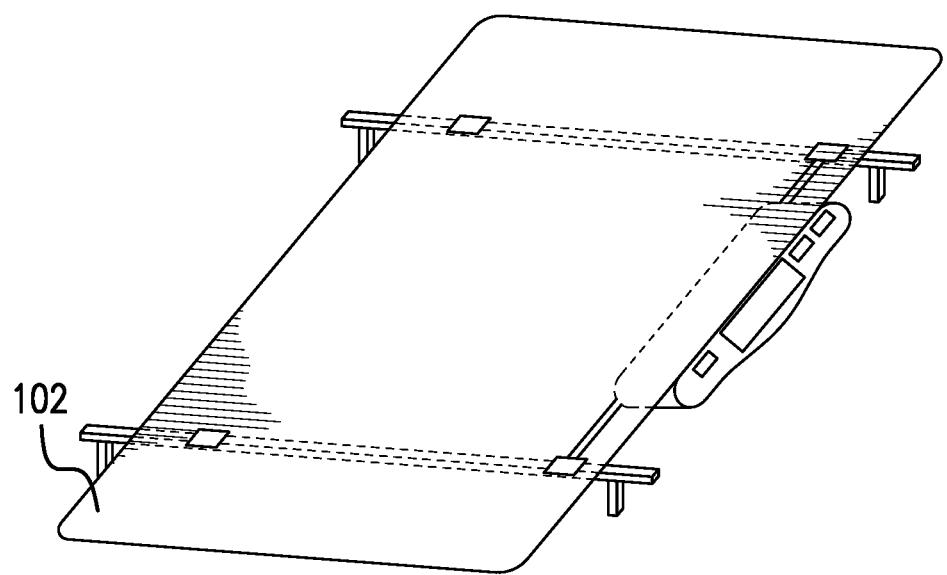
FIG. 13 is an illustration of a platform portion having a tubular support element and locking mechanism for securing the platform portion against an existing luggage rack according to some embodiments of the present disclosure.
Figure 14:
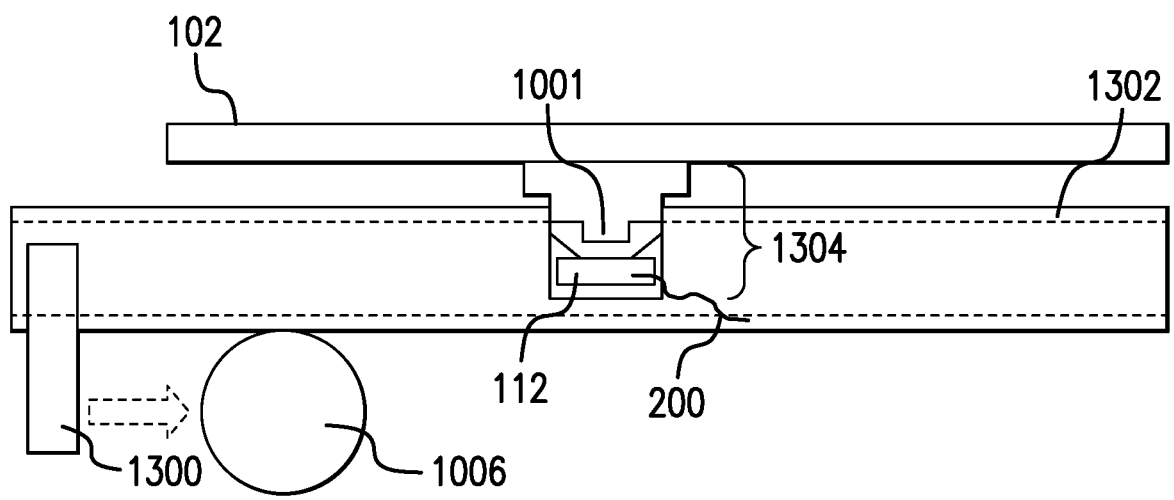
FIG. 14 is a side-view illustration of the platform portion having a tubular support element and locking mechanism according to some embodiments of the present disclosure.

FIGS. 13 and 14 illustrate yet another embodiment of the present invention, wherein the platform portion 102 (made of, for instance, tempered glass) is formed having a movable guide 1300 with a locking mechanism similar to a ratcheting mechanism to secure the platform portion 102 against two existing luggage rails 1006, or beams. FIG. 13 is a top-view illustration of this embodiment. FIG. 14 depicts a side-view of the platform portion 102 and movable guide 1300. The dashed arrow indicates the direction of movement of the movable guide 1300 towards the existing luggage rack rail 1006.

As shown in FIG. 14, the movable guide 1300 works with a tubular support 1302 (comprised of, for instance, metal, plastic, or routed wood with veneer) that is attached with the platform portion 102. The long axis of the tubular support 1302 is perpendicular to the long axis of the platform portion 102, such that it is a cross support. Similar to a socket wrench, the guide 1300 ratchets down from the end of the metal support 1302 to one of the rails, or beams, of an existing luggage rack (as indicated by the dashed arrow). Alternatively, the securing mechanism can be a resistance type mechanism. Any suitable securing mechanism can be used provided that it steadies the platform portion 102 so that when a piece of luggage (e.g., suitcase) is being positioned onto the platform portion 102 resting on the existing luggage rack, the platform portion 102 does not slide around on top of the existing luggage rack. This embodiment further comprises a sensor housing 1304 (comprised of, for instance, plastic) that inserts into a square or round cavity in the metal support 1302 and locks the sensor housing 1304 into place. Adhesive will be used to affix the sensor housing 1304 to the underside of the platform portion 102.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:
1. A weighing luggage rack, comprising:
  a rack portion comprising a top section and a bottom section;
  a platform portion, having a perimeter, and connected with the top section of the rack portion,
  wherein, in use, the platform portion is stacked on top of the rack portion;
  a weighing mechanism comprising four or more load sensors; and an electronic display attached with the platform portion and configured to display a weight of an object placed thereon, wherein the electronic display extends beyond the perimeter of the platform portion.

2. The weighing luggage rack as set forth in claim 1, wherein the four or more load sensors are attached with the platform portion.

3. The weighing luggage rack as set forth in claim 2, wherein the four or more load sensors are attached with the top section of the rack portion.

4. The weighing luggage rack as set forth in claim 1, wherein the weighing mechanism is configured to wirelessly communicate with a mobile application.

5. A weighing luggage rack, comprising:
   a rack portion having a top section and a bottom section, the top section having a perimeter;
   a weighing mechanism comprising four load sensors attached with the rack portion; and
   an electronic display attached with the rack portion and configured to display a weight of an object placed thereon,
   wherein the electronic display extends beyond the perimeter of the top section.

6. The weighing luggage rack as set forth in claim 5, wherein the bottom section of the rack portion comprises four legs, and wherein each of the four load sensors is positioned under a leg in the set of legs.

7. The weighing luggage rack as set forth in claim 5, wherein the four load sensors are attached with the top section of the rack portion.

8. The weighing luggage rack as set forth in claim 5, wherein the weighing mechanism is configured to wirelessly communicate with a mobile application.

9. A weighing luggage rack, comprising:
   a platform portion having a perimeter and formed to be placed on top of an existing luggage rack, wherein the platform portion comprises:
   a weighing mechanism comprising a plurality of load sensors;
   an electronic display attached with the platform portion and configured to display a weight of an object placed thereon; and
   at least one securing element configured to attach with the existing luggage rack,
   wherein the electronic display extends beyond the perimeter of the platform portion.

10. The weighing luggage rack as set forth in claim 9, wherein the weighing mechanism is configured to wirelessly communicate with a mobile application.

11. The weighing luggage rack as set forth in claim 9, wherein the weighing mechanism further comprises a sensor housing surrounding each sensor and attached with the platform portion.

12. The weighing luggage rack as set forth in claim 9, wherein the weighing luggage rack further comprises:
   a tubular support element attached with the platform portion; and
   a movable guide with a locking mechanism formed to engage with the tubular support element, such that the platform portion is secured against at least a portion of the existing luggage rack.

13. The weighting luggage rack as set forth in claim 12, wherein a long axis of the tubular support element is perpendicular to a long axis of the platform portion.

14. The weighing luggage rack as set forth in claim 9, wherein the platform portion is comprised of tempered glass.

15. The weighing luggage rack as set forth in claim 9, further comprising at least one platform brace attached with a bottom portion of the platform portion, wherein the at least one securing element extends from a lower portion of the at least one platform brace.

16. The weighing luggage rack as set forth in claim 9, wherein the securing element is an adhesive.

\* \* \* \* \*